Dec. 22, 1931. H. A. JOHNSTON 1,837,870
DOUBLE PISTON SINGLE CYLINDER INTERNAL COMBUSTION ENGINE
Filed Dec. 3, 1928 3 Sheets-Sheet 1
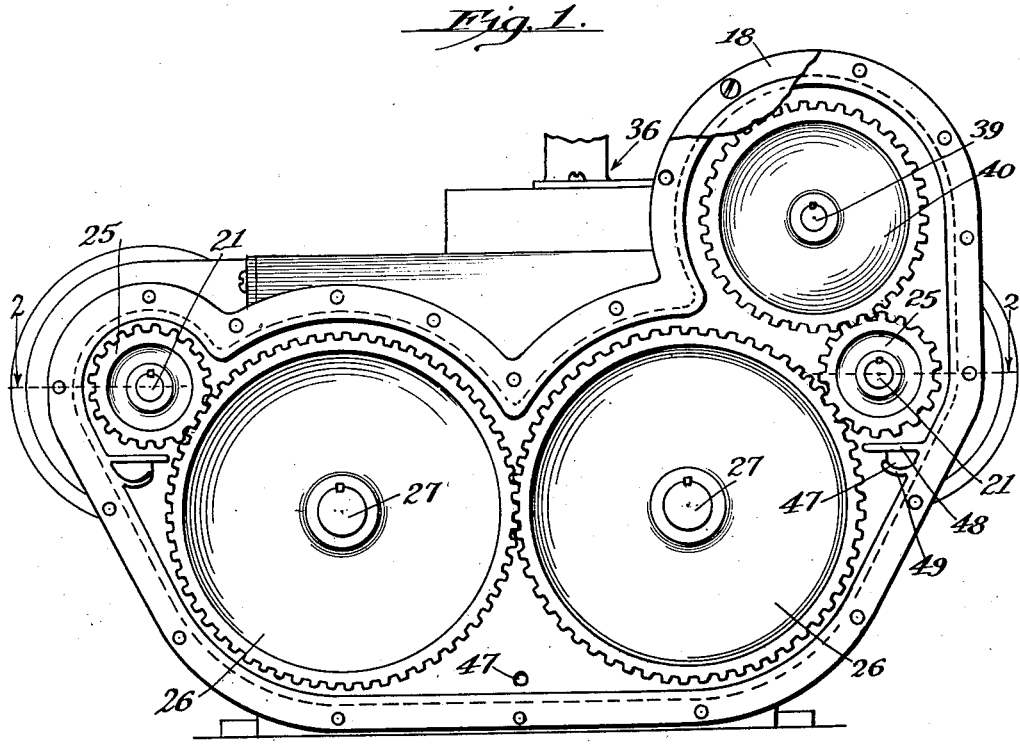
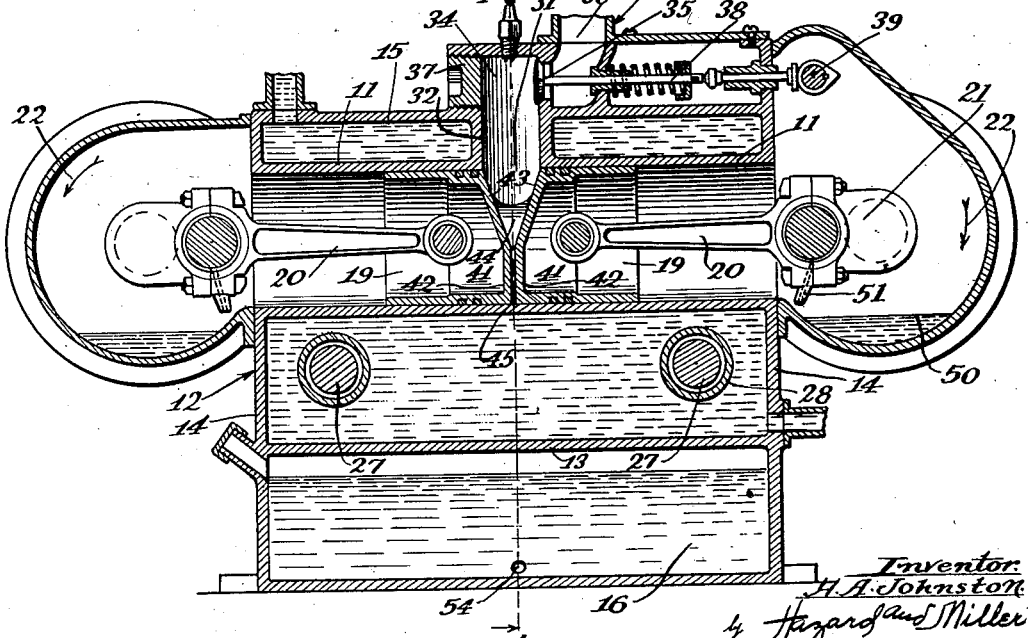
Inventor
H. A. Johnston
by Hazard and Miller
Attorneys.

Dec. 22, 1931.  H. A. JOHNSTON  1,837,870
DOUBLE PISTON SINGLE CYLINDER INTERNAL COMBUSTION ENGINE
Filed Dec. 3, 1928  3 Sheets-Sheet 2
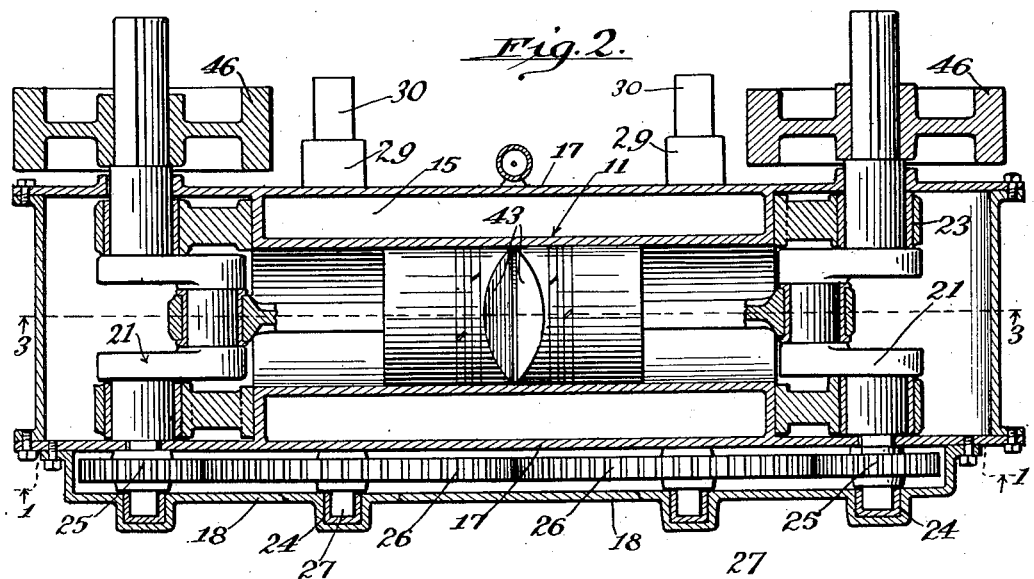
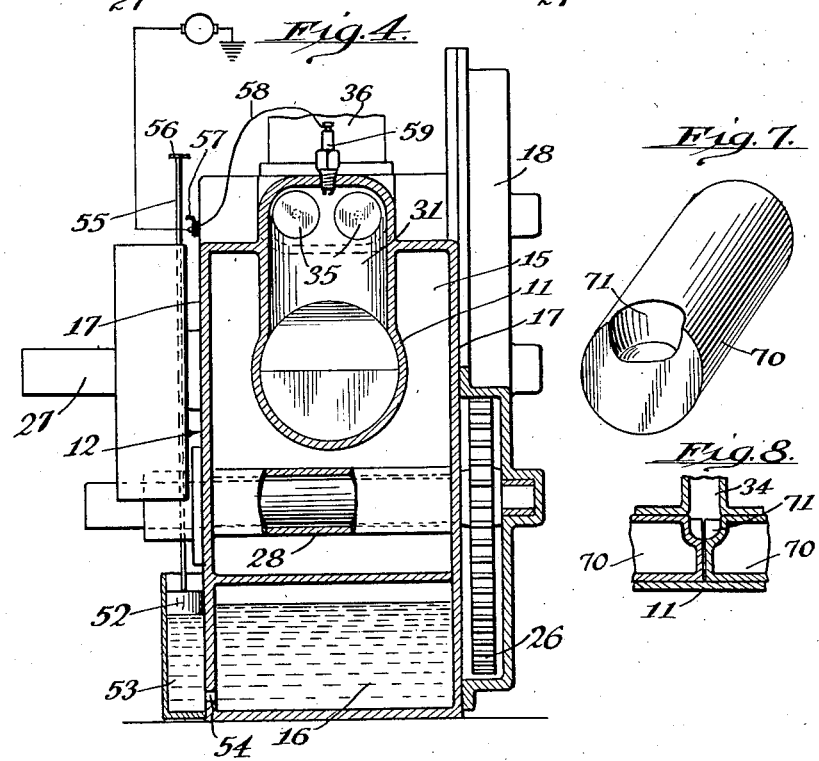
Inventor:
H. A. Johnston
by Hazard and Miller
Attorneys.

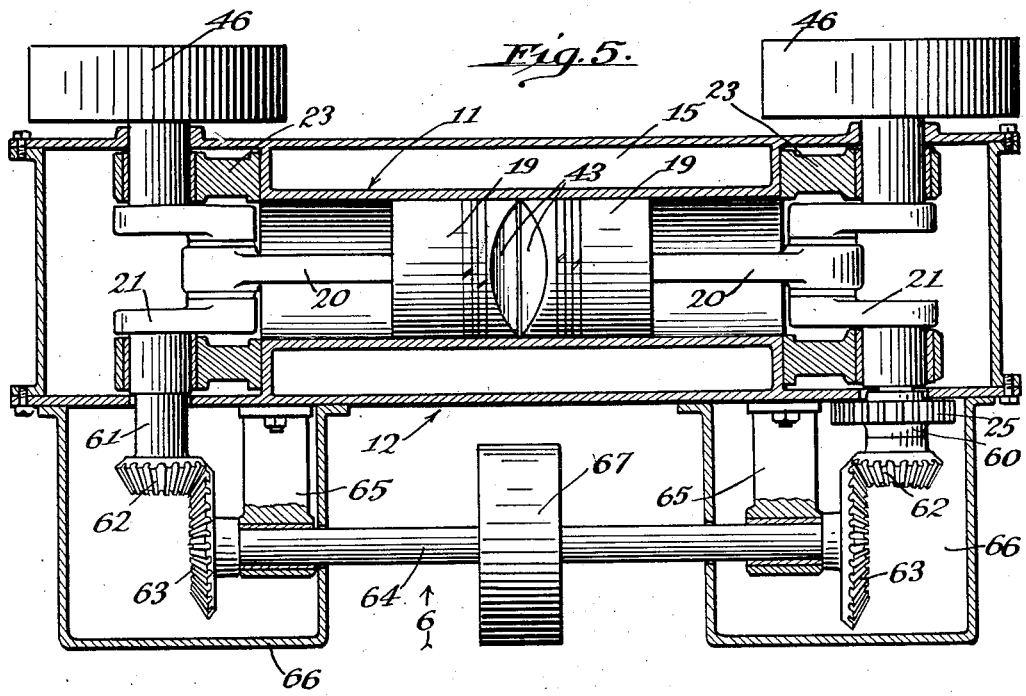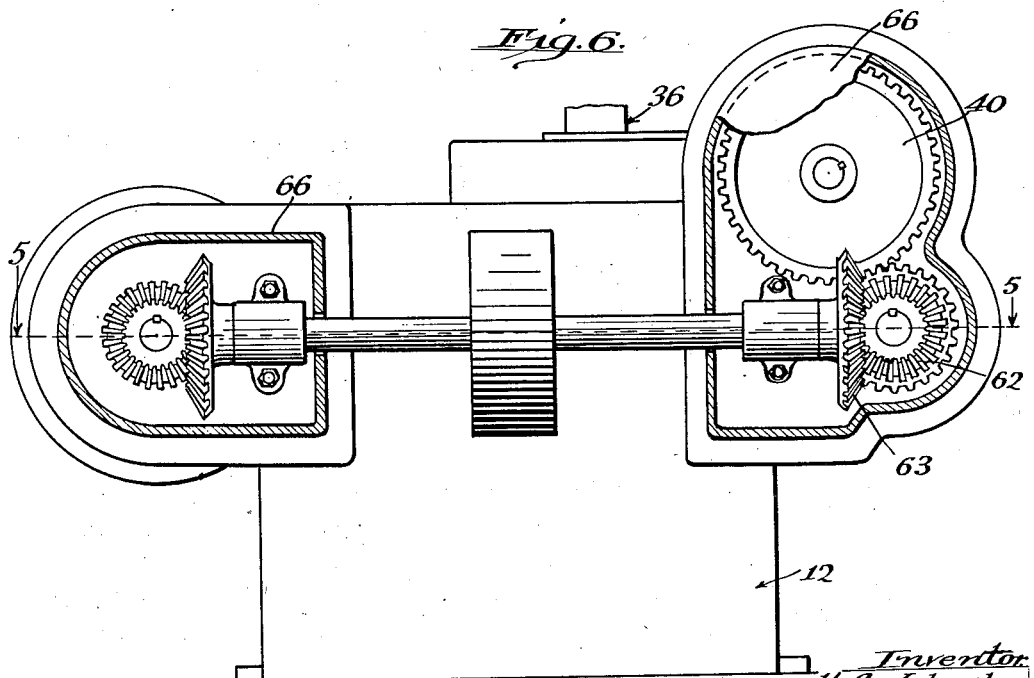

Patented Dec. 22, 1931

1,837,870

UNITED STATES PATENT OFFICE

HARRY A. JOHNSTON, OF REDLANDS, CALIFORNIA, ASSIGNOR TO JOHNSTON TRACTORS COMPANY, LTD., OF LOS ANGELES, CALIFORNIA, A CORPORATION OF CALIFORNIA

DOUBLE PISTON SINGLE CYLINDER INTERNAL COMBUSTION ENGINE

Application filed December 3, 1928. Serial No. 323,429.

My invention is a double piston, single cylinder internal combustion engine.

An object of my invention is the construction of an engine having a single cylinder with opposed pistons operating therein, this being to obtain an engine which will operate with a minimum of vibration. This is effected by having the pistons connected to a pair of cranks by connecting rods and the cranks operating in a reverse direction with means to connect the crank shafts together to insure the constant rotation in synchronism, in opposite directions.

A more particular object of my invention is the connection of the crank shafts by a system of gearing preferably running in oil, so that both crank shafts maintain the same constant speed of rotation and as they are moving in opposite directions, the vibration due to the reciprocating pistons and connecting rods is reduced to a minimum.

Another object of my invention is in the construction of the explosion chamber and the heads of the pistons, whereby a turbulence is given to the fresh gases on the intake. These gases have a swirling movement due to the shape of the combustion chamber and giving a thorough mixture and in this connection the gases enter an explosion chamber on one side of the cylinder and discharge centrally into the central part of the cylinder. The piston heads are constructed having an open space on the side of the combustion chamber so that the combustion gases are forced downwardly by the explosion against the inclined heads of the pistons. Thus in the first action the exploded gases operate somewhat in the manner of a wedge, thrusting the pistons apart.

Another object of my invention is in exhausting the exploded gases from the combustion chamber on one side of the cylinder, the exhaust port being preferably on the same side as the intake port so that the gases have a swirling motion on the intake. This swirling motion is continued in the exhaust and any residual gases maintain the circulatory action so that on the intake port opening, this swirling motion is augmented.

A detail feature of my invention is in forming the heads of the opposed pistons with sloping surfaces on the side adjacent the combustion chamber, the heads being substantially flat from the middle section to the opposite side of the cylinder and when in their innermost position are spaced slightly apart, allowing a clearance for the compression of the charge.

A further object of my invention is in the lubrication system by which the interconnecting gearing which maintains the crank shafts operating in correct synchronism, carries oil from an oil chamber against a baffle. These baffles strip the oil from the main gears, causing it to run in the trough through the crank case. The connecting rods then, by means of dippers splash the oil into the cylinder, thereby lubricating the cylinder and pistons.

A further feature and detail of my invention is in an oil gauge connected by a float to the oil sump and breaking the ignition circuit when the oil level becomes too low.

Another detailed object of my invention is in the manner of taking the power from the engine. This may be done by extending one or more of the shafts having the gearing on the crank shafts and taking power from any one or more of such shafts, these shafts all being parallel to the crank shafts.

In another manner of coupling the crank shafts to operate in synchronism, I utilize bevel gears on the crank shaft connecting to the longitudinal shaft, arranged parallel to the cylinder and the power may be taken off of this longitudinal shaft. The power may therefore be delivered as by a pulley at right angles to the longitudinal axis of the engine.

My invention is illustrated in the accompanying drawings, in which;

Figure 1 is a vertical longitudinal section on the line 1—1 of Fig. 2 in the direction of the arrows, showing principally the interconnecting gearing between the crank shafts, operating in the oil bath;

Fig. 2 is a horizontal section on the line 2—2 of Fig. 1 in the direction of the arrows, through the cylinder, showing the pistons and the crank shafts in plan, with the connecting rod and other bearings cut away;

Fig. 3 is a vertical longitudinal section through the center of the cylinder on the line 3—3 of Fig. 2 in the direction of the arrows;

Fig. 4 is a vertical transverse section on the line 4—4 of Fig. 3 in the direction of the arrows, this being through the center of the cylinder and engine;

Fig. 5 is a longitudinal horizontal section of a modification of my engine, showing a bevel gear connection between the crank shafts with a longitudinal shaft which may be used for delivering power;

Fig. 6 is a side elevation of Fig. 5 taken in the direction of the arrow 6 with the bevel gear casing broken away.

Fig. 7 is a perspective view of another form of piston showing a combustion pocket therein;

Fig. 8 is a detail longitudinal section through a pair of piston heads having a pocket similar to that shown in Fig. 7.

Referring first to the construction of Figs. 1, 2 and 3, the single cylinder 11 is illustrated as mounted in an engine block 12 having a transverse partition 13 at the bottom and with end walls 14. This forms a water jacket 15 surrounding the cylinder. Below the partition 13 there is an oil sump 16. The engine block has side walls 17 and on one side there is a gear housing 18.

A pair of pistons 19 reciprocate in the cylinder and by means of the connecting rods 20 the pistons are linked to the crank shafts 21. These crank shafts are arranged to rotate in an opposite direction as indicated by the arrows 22. The crank shafts are indicated as being journaled in the bearings as indicated at 23 and also on the outside of the gear casing or housing as indicated at 24.

The interconnecting gearing between the crank shafts comprises two small gears 25 mounted on the ends of the crank shaft and operating in the gear housing. These small gears mesh with large gears 26 which are mounted on shafts 27. Such shafts preferably extend through sleeves 28 in the water jacket and project beyond the opposite side of the engine block having journals 29 at such sides so that the ends 30 of these shafts may be used for delivery of power. The gears 26 mesh together and by this medium the crank shafts are connected by an intergearing.

A port 31 is constructed in the upper side of the cylinder and a passage 32 extends through the upper water jacket and through the valve head structure 33. This forms in effect a combustion chamber 34. The valves 35 of the poppet type are located on one side of the combustion chamber and connect to manifolds 36 for the intake and exhaust gases. Removable plugs 37 allow access to the valve heads. The valve stems 38 are operated by a cam shaft 39 having a gear 40 thereon meshing with one of the gears 25 on the crank shafts.

The pistons are constructed in which the heads 41 have a flat surface 42 extending from the lower side substantially to the center, these surfaces 42 being parallel and above the center line extending to the side of each piston there is a sloping surface 43. This may be considered when the pistons are together, as forming a wedge-shaped combustion space 44. The pistons have a clearance 45 between the heads sufficient to prevent striking. The spark plug is located in the combustion chamber 34 in a convenient position to ignite the gases after compression.

In the illustration of Figs. 2 and 4, the crank shaft is shown as extended and has fly wheels 46 mounted thereon. It is obvious however, that the fly wheels may be placed on the shafts 27 having the large gears, if desired. There is an oil connection 47 through the side wall of the engine block between the oil sump 16 and the gear casing or housing 18, so that the large gears 26 dip into the oil and carry it upwardly towards each end on the teeth, the oil being removed by baffles 48 and caught in troughs 49. These troughs lead the oil to the crank case 50 through an opening in the side wall of the engine block and thereby maintain the oil level in the crank case 50. Dippers 51 on the connecting rod bearings dip into the oil and thereby by a splash system lubricate the cylinder and the pistons.

The construction by which the low level of oil stops the engine utilizes a float 52 in a float chamber 53 on one side of the engine block and connected by a duct 54 to the oil sump. This float carries a rod 55 which has a circuit closer 56 which may engage a contact 57, this contact having an electric lead 58 to the spark plug 59. Therefore when the oil is low the circuit closer 56 engages the contact 57 and short circuits the spark plug, thereby stopping the engine.

In the construction illustrated in Figs. 5 and 6, the crank shafts are connected through the medium of the bevel gears and a longitudinal shaft. The crank shafts and extensions 60 and 61 each have a bevel gear 62 mounted thereon. These gears mesh with bevel gears 63 on the lonigtudinal shaft 64. This shaft is journaled in brackets 65 secured to the side of the engine block. The gears are encased in gear housings 66 and the shaft preferably has a fly wheel 67 which may be used as a pulley for a pulley drive or power may be taken in any suitable manner from the shaft 64. In this type of drive I utilize the gear 25 meshing with the gear 40 driving the cam shaft in the same manner as illustrated in connection with Figs. 1 through 4.

An important characteristic of my invention is in having the clearance 45 small, merely enough to keep the piston heads from striking when in their innermost position and as the combustion chamber 34 is quite large, this gives sufficient volume for the compressed gases before the explosion considered also with the wedge-shaped combustion space 44 between the piston heads. This space occupies substantially half of the diameter of the piston heads. Therefore when the compressed gases are ignited by the spark plug, the explosive force is directed laterally against the sloping heads of the pistons and but very little of the burning gases enters the clearing space 45 when the pistons are at their innermost position. As the pistons move outwardly under the influence of the explosion, the exploded gases expand and give an even pressure against the full area of the piston heads. The first or initial action however, is somewhat in the nature of a wedging action.

On the compressive stroke the gases are first compressed evenly against the full area of the piston heads and as the pistons come together and the clearance between the flat sides diminishes, the burnt gases are forced outwardly laterally by the sloping parts of the piston heads. This gives a momentum to the gases, forcing it out of the exhaust valve.

While I have illustrated in the drawings that the engine is constructed with a single cylinder having a pair of pistons therein, it is manifest that I may have a row of cylinders each having two pistons and each piston connected by connecting rods to the crank shafts. Therefore in the specification and claims where I refer to the engine as having a single cylinder, this is not considered as a limiting feature on a multiple cylinder type of engine, each cylinder having two pistons.

It is to be understood that the piston heads may have a wedge-shaped spacing either greater or less than that depicted in Figs. 2 and 3, the function being so that the combustion gases from the side combustion chamber will avoid the hammering effect of a direct explosion on the piston heads. The space between the piston heads extending only partly across the full size of the pistons, prevents the full explosion to act simultaneously on the complete area of the piston heads and therefore eliminates the hammer type of action and gives a more effective expansion for a high compression motor.

In Figs 7 and 8 I show an alternative type of piston in which the piston is designated by the numeral 70 and each piston has a pocket 71 formed therein extending from one side. The pocket lines up when the pistons are together with the lateral combustion chamber 34. This pocket may be made in any suitable shape, it being arranged however, that the initial explosion of the gas cannot spread to cover the full area of the piston heads and thereby avoids the hammer-like action of spaced apart pistons. This type of head on the pistons is suitable for high compression engines.

One of the advantages of the form of my invention as illustrated in Figs. 1, 2 and 3, resides in the power takeoff, which may be accomplished by connecting the projecting ends of the crank shafts 21 or the projecting shafts 30 to a transmission mechanism for taking power to the place desired. As the crank shafts rotate at a much higher speed than the shafts 30, the power taken off from these shafts can readily be arranged to give a two speed drive to any suitable device. It is also manifest that as a crank shaft and the adjacent shaft 30 rotate in opposite directions, that taking the power off from one crank shaft, a drive may be given at a high speed in one direction. Taking the power off from the next adjacent shaft 30 will give a slow speed power delivery in a reverse direction and taking the power off from the remote shaft 30 will give a low speed in the same direction as the crank shaft remote to this latter shaft 30. Also the power takeoff from the opposite crank shaft will give a high speed in the opposite direction to that of the first crank shaft. Therefore by having four shafts from which power may be taken off, I can secure a considerable range of power delivery and in opposite directions of drive.

Various changes may be made in the principles of my invention without departing from the spirit thereof as set forth in the description, drawings and claims.

I claim:

1. An engine having in combination an open end cylinder having a combustion chamber extending laterally from one side at substantially the center, such combustion chamber having a plurality of ports, a pair of opposed pistons each having a partially flat head and a sloping surface, means to operate said pistons when in the innermost position to leave a slight space between the flat ends of the heads and where the said sloping surfaces with the cylinder form a wedge-shaped space in alignment with the said combustion chamber.

2. An engine having in combination an open-ended cylinder, an oval-shaped combustion chamber extending radially from one side of the cylinder at substantially the center, said combustion chamber having a plurality of ports with an ignitable means, a pair of opposed pistons each connected to a crank, said pistons having partially flat parallel tops on the side remote from the combustion chamber and having sloping surfaces forming with the cylinder when the pistons are in the innermost position a somewhat wedge-shaped chamber in alignment with the combustion chamber, the said pistons when in their innermost position having a slight space between their flat parallel ends.

3. An engine having in combination an open-ended cylinder with a combustion chamber extending radially from one side at substantially the center, said combustion chamber having an intake and exhaust port and an igniting means, a pair of opposed pistons each connected to a crank shaft, each piston having a flat parallel head surface on the side remote from the combustion chamber and having a pocket formed in one side, the said pistons when in their innermost position having a slight space between the flat parallel portions and having the pockets form a continuation of the said combustion chamber partly across the pistons.

4. An engine having in combination an open-ended cylinder having an oval-shaped combustion chamber extending radially from one side at substantially the center, said combustion chamber having a plurality of ports and an ignition means, a pair of opposed pistons each connected to a crank shaft, each piston having a flat head surface extending over the major portion of the piston head, said head surfaces being parallel and when the pistons are in their innermost position said surfaces being spaced slightly apart, each piston having a pocket on one side, said pockets when the pistons are in their innermost position forming with the combustion chamber a continuation thereof partly across the pistons whereby the initial explosion of gas from the combustion chamber cannot spread to cover the full area of the piston heads.

5. An engine having in combination a single cylinder open at both ends and having a combustion chamber extending radially from substantially the center, said chamber having a plurality of ports and an ignition means, a pair of pistons each having a head with a flat surface transverse to the piston and each piston having a pocket, the pockets when the pistons are in their innermost position being adapted to register with the combustion chamber, and the said flat surfaces being spaced slightly apart, a crank shaft with a connection from each piston, each crank shaft having a small gear, a pair of intermediate shafts each having a large gear and such large gear being in mesh with a small gear on a crank shaft, the said large gears meshing, each of the shafts having a power take-off, the power take-off from each of the crank shafts being adapted to give a high speed, the power take-off from an intermediate shaft being adapted to give a low speed, the high speed take-offs being in opposite directions and the low speed take-offs being in opposite directions.

In testimony whereof I have signed my name to this specification.

HARRY A. JOHNSTON.